(12) United States Patent
Swan

(10) Patent No.: US 10,041,516 B2
(45) Date of Patent: Aug. 7, 2018

(54) MODULAR CLAMPING SYSTEM

(71) Applicant: Christopher A. Swan, Templeton, CA (US)

(72) Inventor: Christopher A. Swan, Templeton, CA (US)

( * ) Notice: Subject to any disclaimer, the term of this patent is extended or adjusted under 35 U.S.C. 154(b) by 439 days.

(21) Appl. No.: 14/714,132

(22) Filed: May 15, 2015

(65) Prior Publication Data
US 2015/0247516 A1 Sep. 3, 2015

Related U.S. Application Data

(63) Continuation-in-part of application No. 13/467,905, filed on May 9, 2012, now Pat. No. 9,057,394.

(60) Provisional application No. 61/518,568, filed on May 9, 2011.

(51) Int. Cl.
| | | |
|---|---|---|
| *F16B 2/18* | (2006.01) | |
| *F16M 13/02* | (2006.01) | |
| *B25B 5/06* | (2006.01) | |
| *B25B 5/12* | (2006.01) | |
| *B25B 5/08* | (2006.01) | |
| *B25B 5/16* | (2006.01) | |
| *H04R 1/02* | (2006.01) | |

(52) U.S. Cl.
CPC .............. *F16B 2/185* (2013.01); *B25B 5/062* (2013.01); *B25B 5/12* (2013.01); *F16M 13/022* (2013.01); *B25B 5/08* (2013.01); *B25B 5/087* (2013.01); *B25B 5/16* (2013.01); *H04R 1/025* (2013.01); *H04R 2201/021* (2013.01); *Y10T 29/49826* (2015.01); *Y10T 29/49998* (2015.01)

(58) Field of Classification Search
CPC .. B25B 5/062; B25B 5/12; B25B 5/16; B25B 5/122; B25B 5/087; F16B 2/185; H04R 1/025; H04R 2201/021; F16M 13/022; Y10T 29/49826; Y10T 29/49998
USPC ................... 269/24, 228, 257, 143, 249, 32
See application file for complete search history.

(56) References Cited

U.S. PATENT DOCUMENTS

| | | | |
|---|---|---|---|
| 3,229,554 A | | 1/1966 | Haddad |
| 3,338,605 A | * | 8/1967 | Stoeber .................. A47B 96/14 211/188 |
| 3,480,271 A | | 11/1969 | Coutilish |
| 5,312,094 A | * | 5/1994 | Zera ......................... B25B 5/06 269/21 |
| 6,435,493 B1 | * | 8/2002 | Hoover .................. B25B 5/062 269/24 |
| 6,817,603 B2 | | 11/2004 | Kofod |

(Continued)

OTHER PUBLICATIONS

Notice of Allowance for U.S. Appl. No. 14/714,110 dated Dec. 1, 2016.

(Continued)

*Primary Examiner* — Christopher M Koehler
*Assistant Examiner* — Mahdi H Nejad
(74) *Attorney, Agent, or Firm* — Fitch, Even, Tabin & Flannery LLP

(57) ABSTRACT

A clamping system includes a housing, a clamping lever pivotally coupled relative to the housing, a clamping arm pivotally coupled relative to the housing and the clamping lever, and an expandable link coupled to the clamping arm. The clamping lever and the clamping arm are rotatable from an open position to a closed position. A method of mounting a device on a substrate using the clamping system is also provided.

11 Claims, 13 Drawing Sheets

(56) References Cited

U.S. PATENT DOCUMENTS

| | | | | |
|---|---|---|---|---|
| 7,587,872 | B2* | 9/2009 | Kodi | E04C 5/206 52/126.1 |
| 8,950,741 | B1* | 2/2015 | Corriveau | B25J 15/0028 269/24 |
| 9,057,394 | B2 | 6/2015 | Swan | |
| 9,479,852 | B2* | 10/2016 | Yang | H04R 1/025 |
| 2004/0031301 | A1* | 2/2004 | Dominique | E05B 41/00 70/237 |
| 2007/0267799 | A1 | 11/2007 | Dykstra | |
| 2009/0324004 | A1* | 12/2009 | Yang | H04R 1/025 381/395 |
| 2012/0267838 | A1* | 10/2012 | Rentz | B25B 5/122 269/32 |
| 2014/0096454 | A1 | 4/2014 | Meiser | |
| 2014/0352116 | A1 | 12/2014 | Woiler | |
| 2015/0247515 | A1 | 9/2015 | Swan | |
| 2016/0241940 | A1* | 8/2016 | Yang | H04R 1/025 |
| 2016/0366501 | A1* | 12/2016 | Ivey | F16M 13/027 |

OTHER PUBLICATIONS

Restriction Requirement for U.S. Appl. No. 13/467,905 dated Jan. 8, 2014.
Non-final office action for U.S. Appl. No. 13/467,905 dated Jul. 15, 2014.
Notice of Allowance for U.S. Appl. No. 13/467,905 dated Feb. 12, 2015.

* cited by examiner

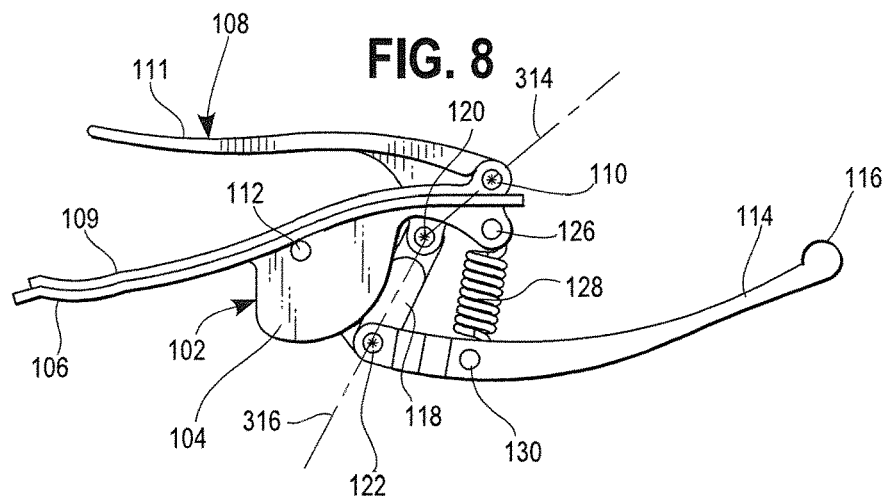
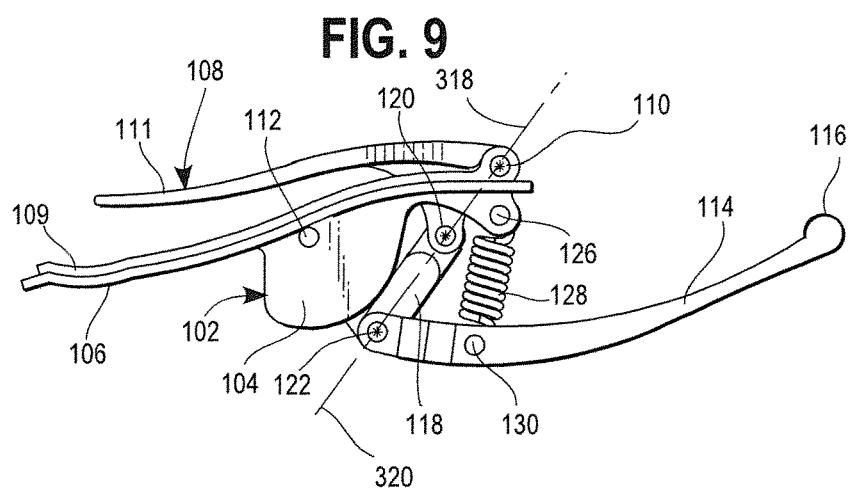
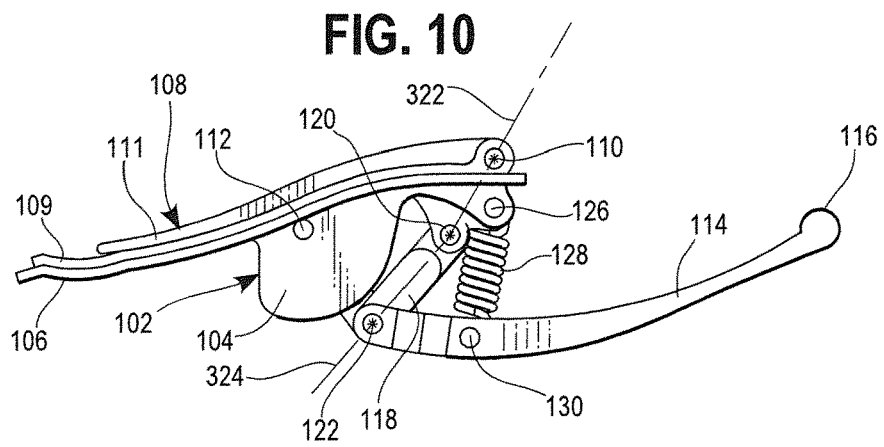

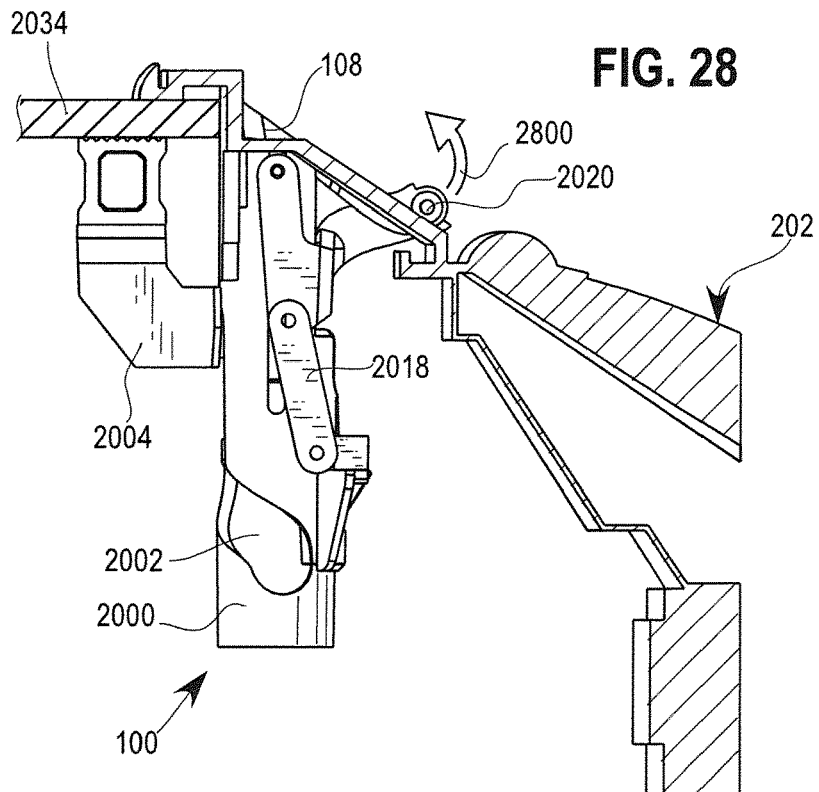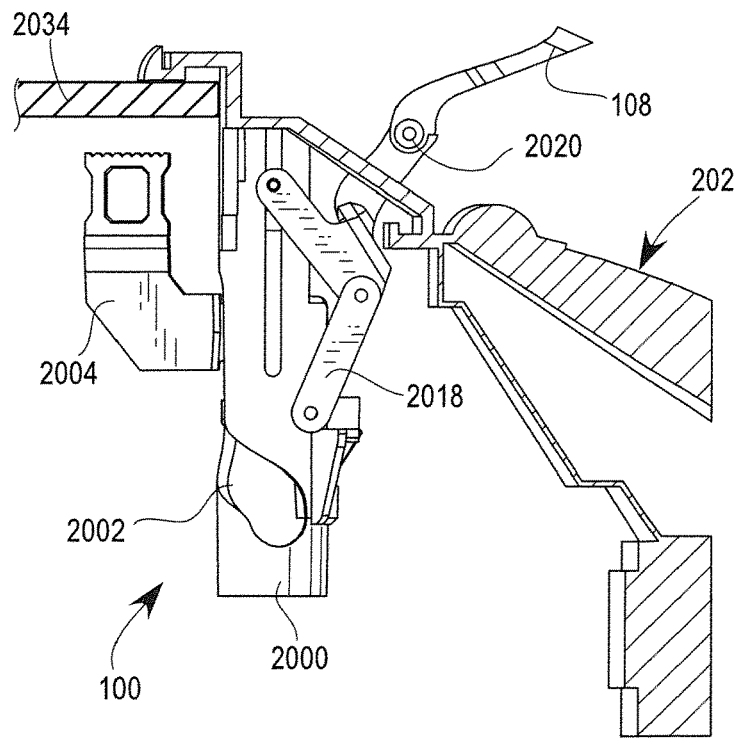

MODULAR CLAMPING SYSTEM

CROSS-REFERENCE TO RELATED APPLICATIONS

This application is a continuation-in-part of U.S. application Ser. No. 13/467,905, filed May 9, 2012, which claims the benefit of U.S. Provisional Application No. 61/518,568, filed May 9, 2011, all of which are incorporated in their entirety herein by reference.

FIELD OF THE INVENTION

This invention relates to clamping devices, and in particular, to clamping devices for mounting various items on a surface.

BACKGROUND OF THE INVENTION

It is desirable to mount electronic equipment and other household items on walls and ceilings. The mounting process can be labor intensive and take a significant length of time. One installation step that takes significant time is the physical connection of the electronic device to the underlying structure such as drywall. For example, mounting sound system speakers or a medicine cabinet to a wall can require the use of multiple mounting brackets and multiple screws to tighten per bracket.

Accordingly, what is needed is a clamping system that not only reduces the time required to mount various electronic and non-electronic household devices to a structure such as wall or a ceiling, but which is modular and easily adaptable to a wide variety of other devices which may need to be mounted to a structure.

SUMMARY OF THE INVENTION

This invention satisfies this need. The foregoing advantages, as well as others, are realized in the present invention in its various embodiments.

In a preferred embodiment, a clamping system includes a housing, a clamping lever pivotally coupled relative to the housing, a clamping arm pivotally coupled relative to the housing and the clamping lever, and an expandable link coupled to the clamping arm. The clamping lever and the clamping arm are rotatable from an open position to a closed position.

The clamping lever can include a first arm and a second arm pivotally coupled to each other. The first arm can be attached to the housing, for example, via an adhesive. The first arm can be removably attached to the housing. The second arm can be in contact with the first arm when the clamping lever is in the closed position.

In one approach, rotation of the clamping lever toward the closed position causes rotation of the clamping arm toward the closed position.

The clamping lever can be rotatable to an over-toggle position configured to prevent the clamping lever from rotating toward the open position.

The clamping lever and the clamping arm can be substantially vertical when in the open position and substantially horizontal when in the closed position.

In one approach, the clamping lever can be pivotally coupled directly to the housing.

The clamping lever and the clamping arm can be pivotally coupled relative to each other via at least one link.

The clamping system can further include a first link coupling the clamping arm to the housing and a second link coupling the clamping lever to the clamping arm. The first and second links can be non-expandable. The first and second links can share a pivot axis.

In one approach, the expandable link can be a spring. The spring can be biased to pull the clamping arm toward the closed position.

The clamping arm can be configured to abut the housing the clamping arm is in the open position. The clamping lever and the housing can form a unitary structure.

The clamping arm and the clamping lever can rotate in the same direction from the open position toward the closed position.

A method of mounting a device on a substrate using the clamping system comprises inserting the clamping system at least partially into an opening in the device and through an opening in the substrate, actuating the clamping lever to rotate the clamping lever toward the closed position, and causing, via the actuating of the clamping lever, the clamping arm to rotate toward the closed position such that a portion of the clamping arm comes into contact with an interior surface of the substrate.

In one embodiment, a clamping system comprises a housing including a body portion and arm portion and a clamping lever having at least a first pivot joint and a second pivot joint. The clamping lever is pivotally coupled relative to the housing at the first pivot joint. The clamping system further comprises a clamping arm having a first end including at least one pivot joint and a second end adapted to abut a substrate surface. The clamping arm is pivotally coupled relative to the housing via a first link. The clamping lever and the clamping arm are pivotally coupled relative to each at the second pivot joint of the clamping lever and the at least one pivot joint of the clamping arm via a second link. The clamping arm is coupled to the housing via a third link that is expandable. The clamping lever and the clamping arm are rotatable from an open position to a closed position and rotation of the clamping lever toward the closed position causes movement of the first, second, and third links and the rotation of the clamping arm toward the closed position.

In a further embodiment, the invention can be characterized as a clamping system for clamping a structure to a substrate having a hole, comprising: a clamping assembly including a clamping arm coupled to a housing, wherein the housing is coupled to the structure; a clamping lever coupled to the clamping assembly, wherein the clamping arm is in an open arm position when the clamping lever is in an open lever position, and wherein the clamping arm in the open arm position is configured to be located entirely within a hole perimeter when the structure is placed in the hole, and wherein the clamping lever and the clamping assembly are configured such that moving of the clamping lever to a closed lever position moves the clamping arm to a closed arm position, wherein the closed arm position includes the clamping arm located at least partially outside the hole perimeter and the clamping arm contacting the substrate.

In yet another embodiment, the invention can be characterized as a clamping system for clamping a structure to a substrate having a hole comprising: a housing; a link assembly comprising: a right first link pivotally coupled to the housing, a left first link pivotally coupled to the housing, and a second link pivotally coupled to the right first link and to the left first link, and slidably coupled to the housing; a clamping assembly, wherein a portion of the clamping assembly is encased within the housing and configured to slidably move within the housing, the clamping assembly further comprising a clamping arm coupled to an expandable link, the expandable link coupled to the second link; a clamping lever pivotally coupled to the second link, the second link pivotally coupled to the housing, wherein the clamping arm is in an open arm position when the clamping lever is in an open lever position, the open arm position including the clamping arm located entirely within a perimeter of the hole when the structure is inserted in the hole and the clamping arm not in contact with the substrate, and whereby moving the clamping lever to a closed lever position moves the clamping arm to a closed arm position such that the clamping arm is located at least partially outside the hole perimeter and contacting the substrate.

In yet another embodiment, the invention can be characterized as a method of mounting a structure on a substrate having a hole, the method comprising: inserting the structure in the hole, the structure coupled to at least one clamping system in an open position, the at least one clamping system comprised of: a housing; a link assembly comprising: a right first link pivotally coupled to the housing, a left first link pivotally coupled to the housing, and a second link pivotally coupled to the right first link and the left first link, and slidably coupled to the housing; a clamping assembly, wherein a portion of the clamping assembly is encased within the housing and configured to slidably move within the housing, the clamping assembly further comprising a clamping arm coupled to an expandable link, the expandable link coupled to the second link; a clamping lever pivotally coupled to the second link, the second link pivotally coupled to the housing, wherein the clamping arm is in an open arm position when the clamping lever is in an open lever position, the first position including the clamping arm located entirely within a perimeter of the hole when the structure is inserted in the hole and the clamping arm not in contact with the substrate, and whereby moving the clamping lever to a closed lever position moves the clamping arm to a closed arm position such that the clamping arm is located at least partially outside the perimeter of the hole and contacts the substrate; moving the clamping lever from the open lever position to the closed lever position, resulting in a movement of the clamping arm from the open arm position to the closed arm position.

BRIEF DESCRIPTION OF THE DRAWINGS

FIG. 8 depicts a side elevational view of the clamping system of FIG. 1 showing the linear relationship between several pivot points of the clamping system in an open position of an over-toggle implementation.

FIG. 9 depicts a side elevational view of the clamping system of FIG. 1 showing the linear relationship between several pivot points of the clamping system in an intermediate position of the over-toggle implementation.

FIG. 10 depicts a side elevational view of the clamping system of FIG. 1 showing the linear relationship between several pivot points of the clamping system in a closed position of the over-toggle implementation.

FIG. 28 depicts a side elevational view of the clamping system shown in the locked position prior to being unlocked.

FIG. 29 depicts a side elevational view of the clamping system shown in the unlocked position.

DETAILED DESCRIPTION OF THE DRAWINGS

Figure 1:
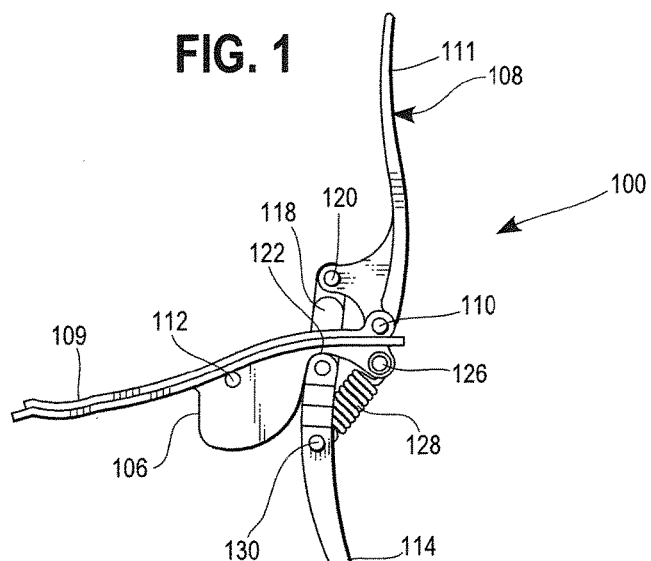
FIG. 1 depicts a side elevational view of a clamping system according to one embodiment of the present invention shown fully open.
Figure 2:
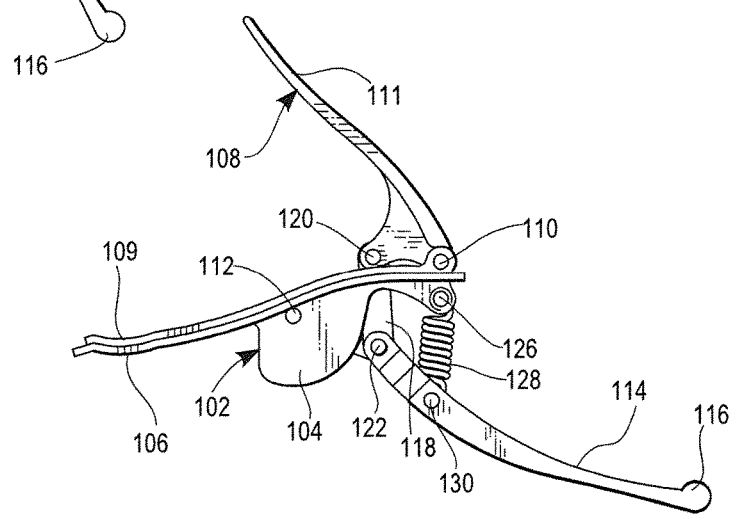
FIG. 2 depicts the clamping system of FIG. 1 shown with the clamping lever and the clamping arm being partially moved toward the closed position.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Generally, a clamping system is provided. The clamping system can be used for mounting a variety of devices to various surfaces. For example only, the clamping system can be used to mount sound system speakers, clocks, lighting and plumbing fixtures, medicine cabinets, mailboxes, or the like on interior and exterior walls, ceilings, beams, doors, or the like.

One common limitation encountered when mounting an item to a ceiling or wall is the inability of the user to access the inside face of the wall or ceiling after the item is positioned to cover a mounting hole. This limitation prevents the use of typical clamping systems, as they generally require access to both sides of the mounting substrate.

The present invention utilizes a lever on the accessible side of the item to actuate a clamping arm on the inaccessible side of the item, thus moving the clamping arm from a non-clamping position to a clamping position, without requiring user access to the inside of the substrate. Furthermore, the clamping arm in the non-clamping position is located such that it permits the item to be installed in the mounting hole prior to actuating the lever and moving the clamping arm.

Referring to FIGS. 1-5, a preferred embodiment of the clamping system 100 is shown. The clamping system 100 includes a housing 102 having a body portion 104 and an arm portion 106. The housing 102 can serve both as a support structure for the components of the clamping system 100 and to mount the clamping system 100 to an intended device and/or structure.

The clamping system 100 includes a clamping lever 108. As shown in FIG. 1, the clamping lever 108 can include a first arm 109 and a second arm 111 pivotally coupled relative to the first arm 109. For example, the first arm 109 and the second arm 111 can be coupled to each other at a pivot joint 110 that may include a pivot pin. For purposes of this application, a pivot joint will be understood to mean any structure or assembly that provides for a member which includes or is connected to the pivot joint to rotate, pivot, or turn. For example only, the pivot joint can be in the form of a pivot pin/pinhole assembly, a hinge assembly, a ball bearing assembly, a link assembly, or the like. The pivot joint 110 can be fixed as shown in FIG. 1 or may alternatively be movable. The first arm 109 can be removably or nonremovably attached to the arm portion 106 of the housing 102, for example via an interlocking lock and pin assembly, an adhesive, welding, injection molding, or the like.

In an alternative approach, the clamping lever 108 can comprise only one arm 111 which is pivotally coupled directly to the housing 102 via the pivot joint 110. While the clamping lever 108 has been shown in FIG. 1 as being substantially sigmoidal, it is to be appreciated that the clamping lever 108 can be entirely or partially curved or entirely or partially straight, or can have any other suitable shape. The first arm 109 of the clamping lever 108 may be made of a rigid material or materials or may be flexible. The clamping lever 108 can be actuated by a user to mount a household device to a desired structure as discussed hereinbelow.

Figure 5:
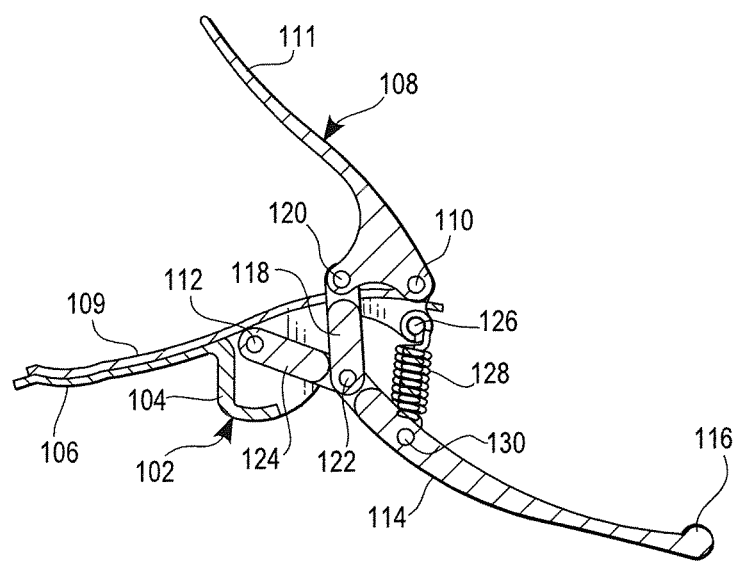
FIG. 5 depicts a sectional side elevational view of the clamping system of FIG. 1 taken along lines 5-5 of FIG. 4.

Referring to FIG. 5, the clamping system 100 further includes a clamping arm 114. The clamping arm 114 is elongate and can be curved as shown in FIG. 5, or can be at least in part straight or undulating. The clamping arm 114 may be made of a rigid material or materials or may be flexible. One of the ends of the clamping arm 114 can include a bulbous end portion 116 as shown, for example, in FIG. 5. The bulbous end portion 116, if present, can provide an anchoring structure to the clamping arm 114 when the clamping arm 114 is positioned in contact with a drywall surface. The end portion 116 can restrict and/or prevent slippage of the clamping arm 114. It is to be appreciated that instead of having the bulbous end portion 116, the clamping arm 114 may be made of a spring metal material or may include a lip, a ridge, a shoulder, an abutment, or any other structure suitable for anchoring the clamping arm 114 on the interior surface of the drywall.

With continuing reference to FIG. 5, the clamping arm 114 is can be pivotally coupled relative to the housing 102 and the clamping lever 108 either directly, or via one or more links. For example, the clamping arm 114 can be pivotally coupled relative to the clamping lever 108 via a link 118 coupled to pivot joints 120 and 122 that can include pivot pins. The clamping arm 114 can be also pivotally coupled relative to the housing 102 via a link 124 coupled to pivot joints 112 and 122 that can include pivot pins. The clamping arm 114 can be further coupled relative to the housing 102 via an adjustable or expandable link 128 coupled to pivot joints 126 and 130. The expandable link 128 can be in the form of a spring, which can expand upon rotation of the clamping arm 114 in a clockwise direction and contract upon rotation of the clamping arm 114 in a counterclockwise direction.

It is to be appreciated that instead of the expandable link 128, the clamping system 100 may include an adjustable or telescopic link, or a rigid link and a flexible clamping arm. The spring 128 can be biased to pull the clamping arm 114 toward the closed position shown in FIG. 3. The components of the clamping system 100 can be made of a variety of materials such as metals and plastics including, but not limited to, aluminum, stainless steel, zinc, pot metal, acrylonitrile butadiene styrene (ABS), polypropylene (PP), polycarbonate (PC), Nylon, wood, medium density fibreboard (MDF), or the like. The clamping system 100 can also be made in a variety of shapes and sizes and is also adaptable to accommodate substrates of varying thicknesses as discussed below.

Figure 3:
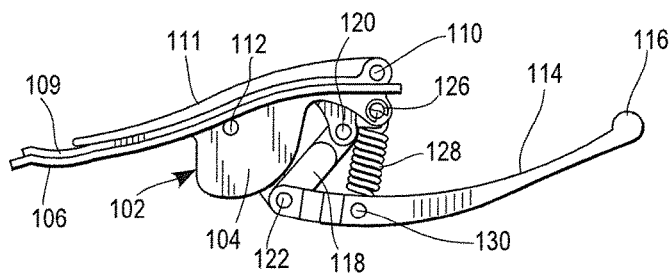
FIG. 3 depicts the clamping system of FIG. 1 shown with the clamping lever and the clamping arm being in the closed position.
Figure 4:
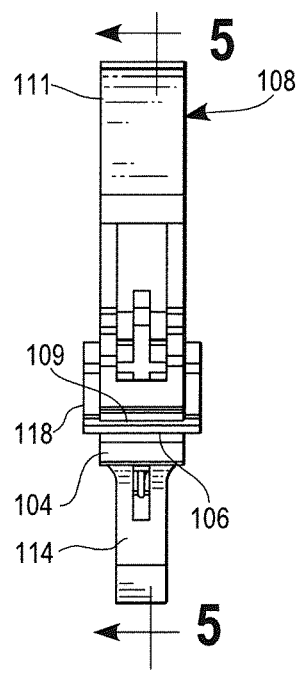
FIG. 4 depicts a rear elevational view of the clamping system of FIG. 1

The components of the clamping system 100 can be movable from an open or unlocked position shown in FIG. 1 to a closed or locked position shown in FIG. 3. In the open configuration of FIG. 1, the clamping lever 108 is substantially vertical. As the user actuates the clamping lever 108, the clamping lever 108 pivots about the pivot joints 110 and 120 and rotates through an intermediate position shown in FIG. 2 to a locked position shown in FIG. 3. The rotation of the clamping lever 108 through its range of motion from the open position toward the closed position causes movement of the links 118, 124, and 128 and the clamping arm 114 to pivot about the pivot joint 122 from its open position shown in FIG. 1 to an intermediate position shown in FIG. 2 and to a locked position shown in FIG. 3. In the open position, a portion of the clamping arm 114 abuts the body portion 104 of the housing 102 and is prevented from rotating past the open position as shown in FIG. 1.

Figure 6:
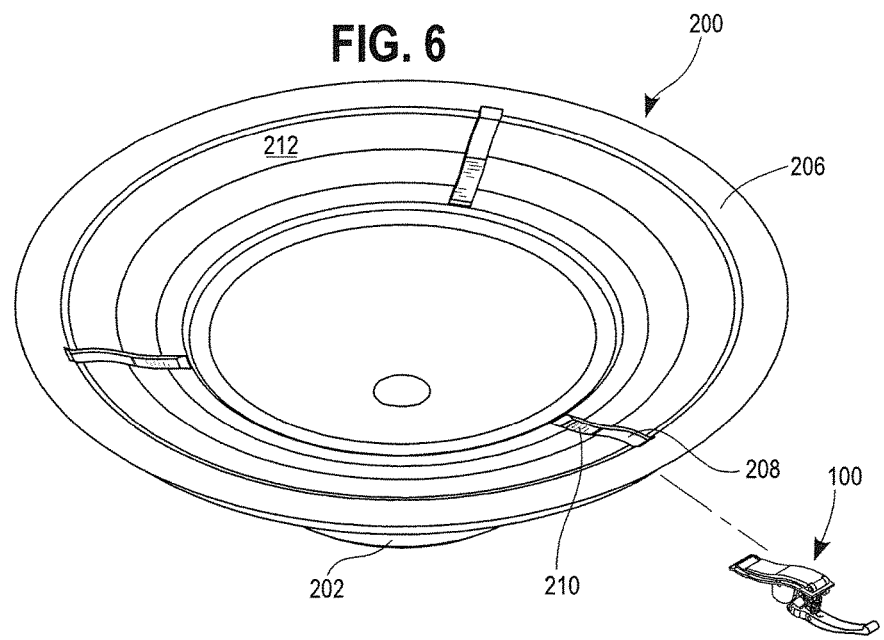
FIG. 6 depicts a perspective exploded view of an exemplary device that can be mounted on a substrate with the clamping system of FIG. 1

The clamping system 100 is modular and can be interchangeably used with a variety of electronic or non-electronic devices and household items. As such, the clamping system 100 can be a self contained clamping module which can be installed into an appropriate structure of any suitable device, for example, a slot 208 of a sound system speaker 200 as shown in FIG. 6. Numerous other configurations of the clamping system 100 and devices to be mounted to a substrate would be apparent to one skilled in the art.

Figure 7:
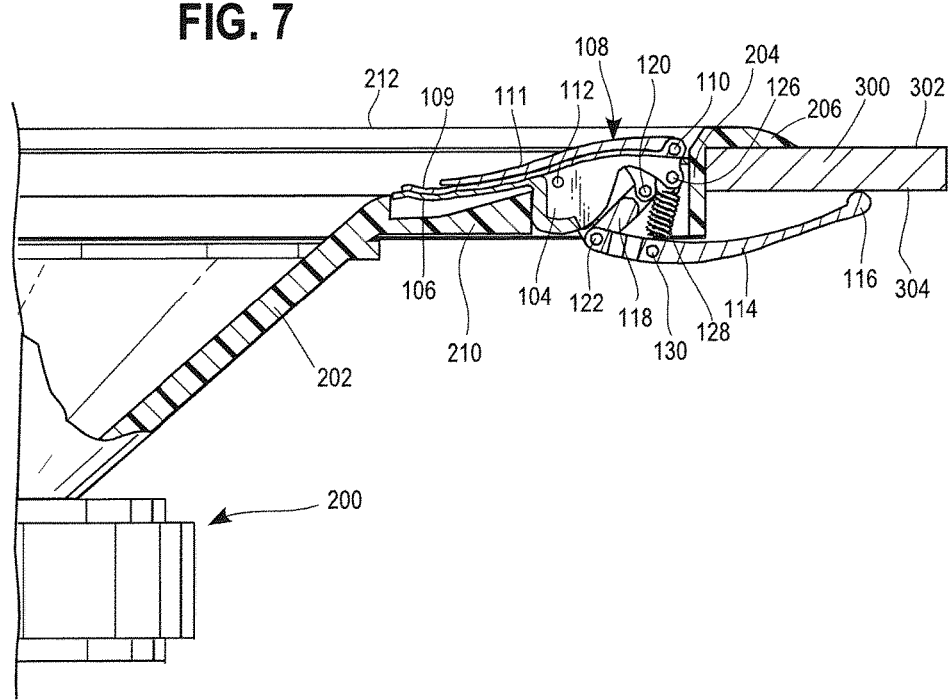
FIG. 7 depicts a partial enlarged side elevational view of the device of FIG. 6 being mounted to a surface such as a drywall with the clamping system of FIG. 1 being shown in cross-section.

Referring to FIG. 7, the speaker 200 can have a body portion 202 including a side wall 204 that includes a projecting flange 206 which can be substantially perpendicular to the side wall 204. The speaker 200 can include one or more through openings or slots 208 sized and shaped to receive the clamping system 100. The speaker 200 can be mounted on a structure such as a wall 300 substantially as shown in FIG. 7. The wall 300 has an exterior surface 302 which would face a user and an interior surface 304 which would not be visible to a user. The speaker 200 can be positioned relative to the wall 300 such that the flange 206 of the speaker 200 can abut the exterior surface 302 of the wall 300 as shown in FIG. 7.

Typically, an opening would be made in the wall 300 to permit the insertion of at least a portion of the clamping system 100 therethrough. The clamping system 100 can be inserted into the slot 208 of the speaker 200 such that the clamping arm 114 passes through the slot and the opening in the wall 300 and extends on the interior of the wall 300 until the bulbous end portion 116 of the clamping arm 114 abuts the interior surface 304 of the wall 300 as shown in FIG. 7. As such, the clamping system the speaker 200 can be secured on the wall 300 via the cooperation of the flange 206 of the speaker 200 and the clamping arm 114 of the clamping system 100.

The clamping system 100 can be recessed within a slot 208 in the speaker 200 so that the arm 111 of the clamping lever 108 can be below the upper surface 212 of the speaker 200 as shown in FIG. 7. As shown in FIG. 6, the arm 111 of the clamping lever 108 of the clamping system 100 can be contoured to correspond to the shape of the portions of the upper surface 212 of the speaker 200 that surround the slots 208. As such, the clamping system 100 may be positioned in the slot 208 of the speaker 200 such that the arm 111 of the clamping lever 108 does not protrude above the upper surface 212 of the speaker 200, but is flush with the upper surface 212 of the speaker 200, so that the upper surface 212 of the speaker 200 is contiguous.

The clamping system 100 can be secured in the slot 208 in a variety of ways. In one approach shown in FIG. 7, the interior of the slot 208 can include an inclined platform 210 which acts as a stop for the housing 102 and prevents the entire clamping system 100 from passing through the slot 208. In another approach, the slot 208 can include a structure such as a lip, a ridge, or a shoulder that would secure the clamping system 100 within the slot 208. In yet another approach, the clamping system 100 can be secured within the slot 208 by a fastener such as a set screw passing through a portion of the speaker 200, the slot 208 and the housing 102 of the clamping system 100.

Referring to FIGS. 8-10, the clamping system 100 can be locked so that a desired device is permanently affixed to a structure. One such locking method usable with the clamping system 100 can be a mechanical over-toggle as described in more detail below.

Referring to FIG. 8, the clamping lever 108 can be actuated by a user as described above in reference to FIGS. 1-3. An axis 314 passing through the fixed pivot joint 110 of the clamping lever 108 and the pivot joint 120 defines one side of the over-toggle mechanism. An axis 316 passing through the pivot joint 120 and the pivot joint 122 of the clamping arm 114 defines the second side of the over-toggle mechanism. As the clamping lever 108 is actuated by a user from an open position toward a locked position and brought to a position shown in FIG. 8, axes 314 and 316 form an obtuse angle to the right, indicating that the clamping lever 108 is in the pre-toggle position. As the clamping lever 108 continues through its motion toward the locked position and is brought to a position shown in FIG. 9, the pivot joints 110, 120 and 122 become co-linear, as indicated by axes 318 and 320.

The configuration shown in FIG. 9 is the toggle point where the clamping arm 114 reaches its further position of travel. As the clamping lever 108 continues through its rotation toward the locked position and is brought to a position shown in FIG. 10, the clamping lever 108 becomes fully clamped. At this point, the pivots joints 110 and 122 have moved past the toggle axes 318 and 320 of FIG. 9 and reached their final positions indicated by axes 322 and 324 in FIG. 10. The axes 322 and 324 form an obtuse angle to the left as shown in FIG. 10, indicating a fully clamped position of stability. In the fully clamped position shown in FIG. 10, the clamping arm 114 reaches its resting position such that any force on the clamping system 100 will attempt to push the clamping arm 114 further past its resting position, resulting in the tightening of the over-toggle mechanism.

In another approach, the clamping system 100 may include one or more screws driven through the clamping lever 108 into the housing 102 of the clamping system 100, or through the device being mounted to mechanically secure the clamping lever 1008 in its fully clamped position.

Referring to FIGS. 11-14, one method of accommodating various substrate thicknesses within the clamping system 100 is described.

When fully actuated, the clamping lever 108 rotates to the closed position as described above. With the clamping lever 108 moving into the closed position, the clamping arm 114 is caused to move into its closed position, including the over-toggle described above. The expandable link 128 of the clamping system 100 permits the clamping arm 114 to be rotated to various positions accommodating substrates 406, 408, and 410 having different thickness.

Figure 11:
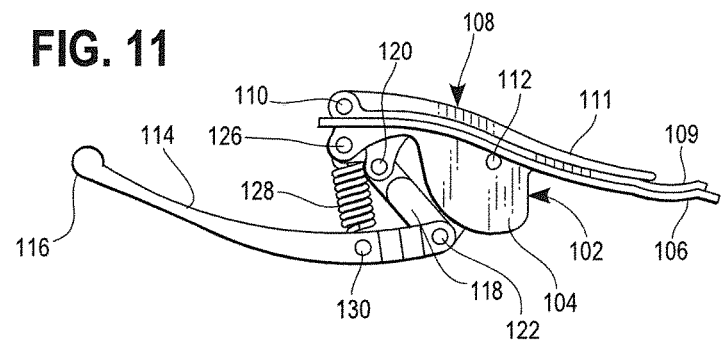
FIG. 11 depicts a side elevational view of the clamping system of FIG. 1 not mounted to a substrate and the expandable link in a relaxed position.
Figure 12:
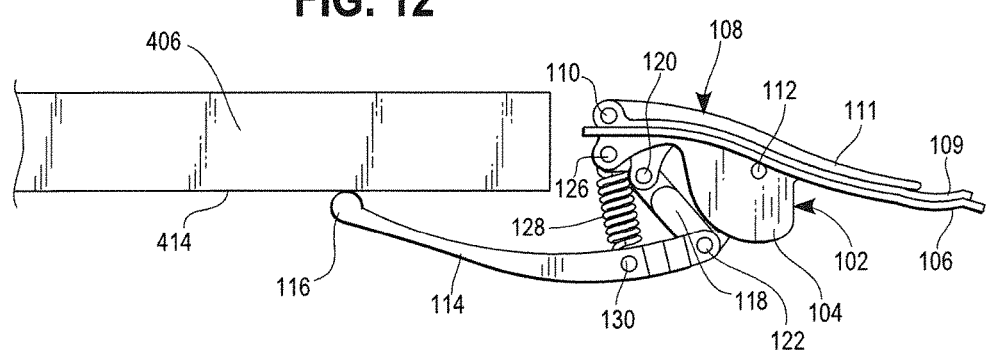
FIG. 12 depicts the same view as in FIG. 11, but showing the clamping system of FIG. 1 mounted to a drywall with the expandable link slightly extended.
Figure 13:
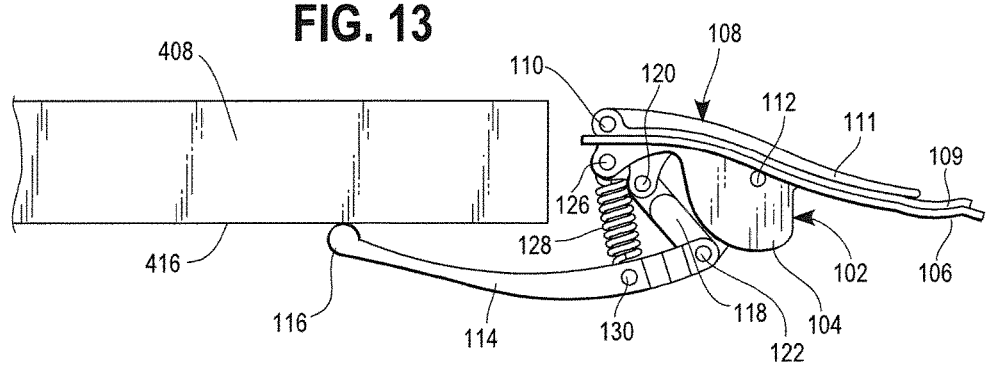
FIG. 13 is the same view as in FIG. 12, but showing the clamping system mounted to a drywall that is thicker than the drywall of FIG. 12 shown with the expandable link slightly further extended compared to FIG. 12.
Figure 14:
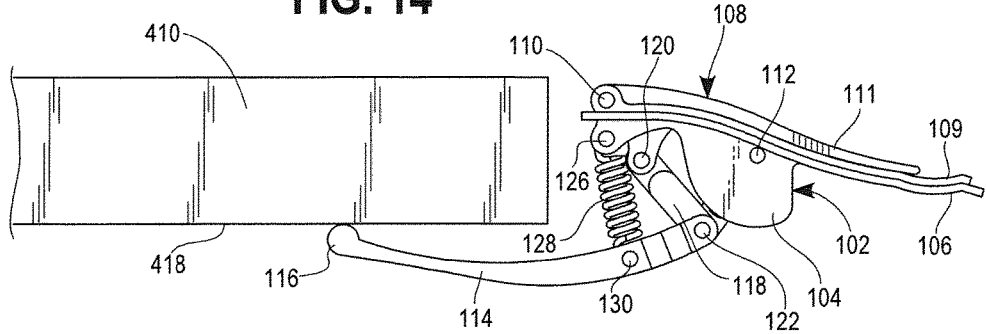
FIG. 14 is the same view as in FIG. 13, but showing the clamping system mounted to a drywall that is thicker than the drywall of FIG. 13 shown with the expandable link slightly further extended compared to FIG. 13.

The expandable link in the form of a spring 128 of the clamping system 100 is shown in four different positions in FIGS. 11-14. In FIG. 11, the spring 128 is shown in a relaxed or fully retracted position with no substrate. In FIGS. 12-14, the spring 128 is shown in increasingly expanded positions when used with substrates 406, 408, and 410 each having a progressively increasing thickness. It is to be appreciated that FIGS. 11-14 are exemplary and not intended to be to scale and that the clamping system 100 may be made in a variety of sizes to accommodate a variety of substrates having differing thicknesses. In one exemplary approach, the clamping system 100 may be from 1.0 inch to 1.25 inch in length, the substrate 406 may have a thickness of 0.5 inch, the substrate 408 may have a thickness of 0.675 inch, and the substrate 410 may have a thickness of 0.75 inch. In each instance, a portion of the clamping arm 114, in this embodiment, end portion 116, contacts the interior surface, 414, 416, and 418 of the substrate, respectively, as shown in FIGS. 12-14. Thus, as the substrate becomes progressively thicker, the adjustable link 128 can expands to accommodate the substrate thickness, permitting the clamping system 100 to be used with substrates of varying thickness.

Referring now to FIGS. 15-19, various examples and applications of the modular clamping system 100 are shown to provide illustrations of certain exemplary usages of the clamping system 100. Although the clamping system 100 has been illustrated in FIGS. 15-19 in use with electronic devices such as speakers, the clamping system 100 can be used with various other electronic or non-electronic devices and numerous other configurations and combinations of the components are considered to be within the scope of the present invention.

Figure 15:
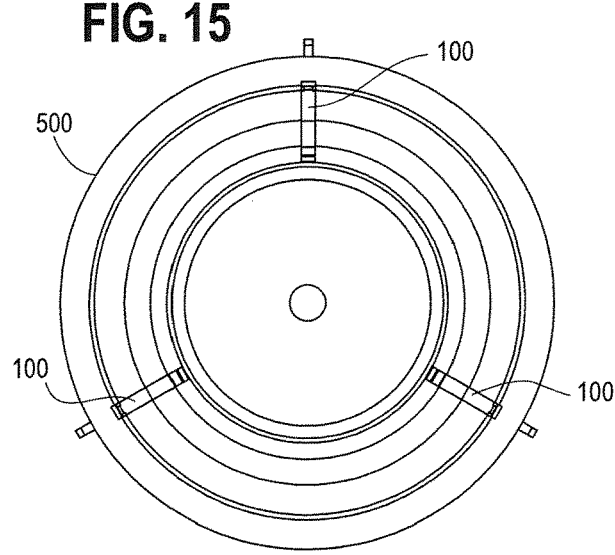
FIG. 15 depicts a side elevational view of the device of FIG. 6 being shown fitted with three clamping systems of FIG. 1.

FIG. 15 shows a round loudspeaker 500, which is also representative of any round electronic or non-electronic device. To clamp a relatively light device such as the loudspeaker 500 to a substrate such as a wall, only three clamping systems 100 can be sufficient. As such, FIG. 15 shows the loudspeaker 500 fitted with three clamping systems 100.

Figure 16:
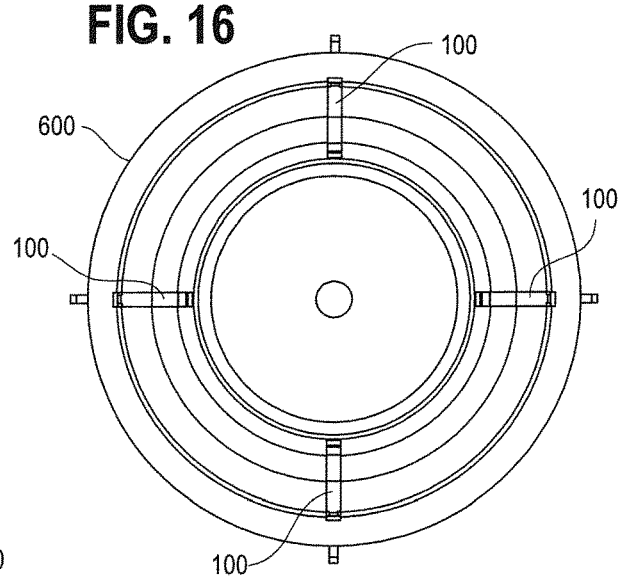
FIG. 16 depicts a side elevational view of another exemplary device being shown fitted with four clamping systems of FIG. 1.

FIG. 16 shows a round loudspeaker 600 which is also representative of any round electronic or non-electronic device that is heavier and/or larger in size than the round device 500 of FIG. 15. To sufficiently clamp a more massive device 600 to the substrate, it may be desirable to use more than three clamping systems 100. For example, the device 600 can be mounted on the substrate via four clamping systems 100.

Figure 17:
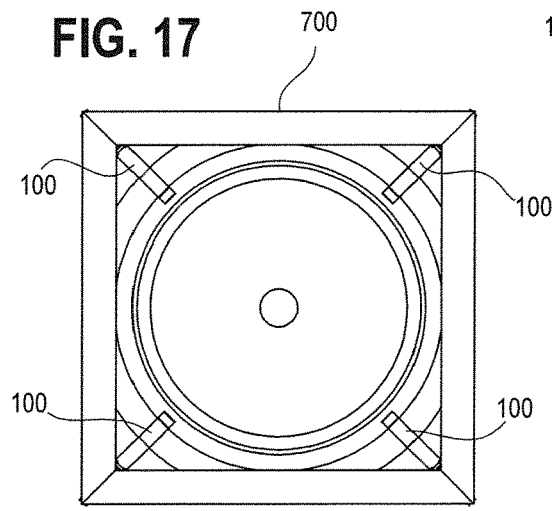
FIG. 17 depicts a side elevational view of another exemplary device being shown fitted with four clamping systems of FIG. 1.
Figure 18:
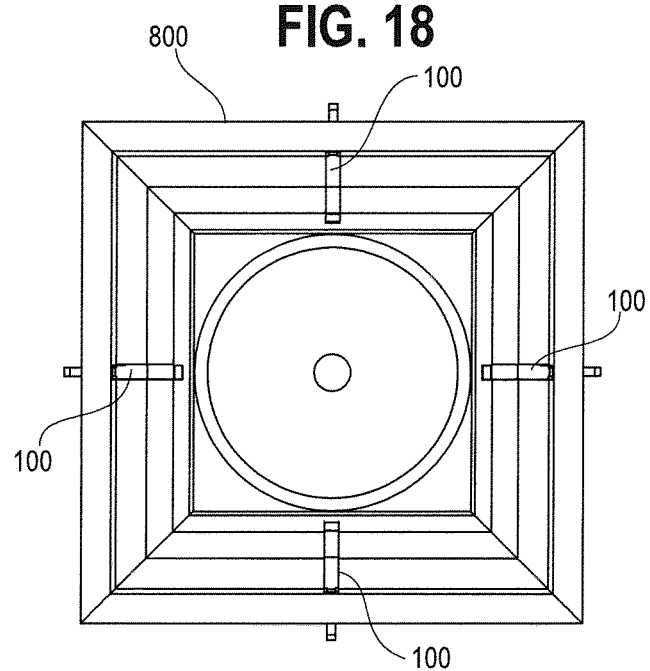
FIG. 18 depicts a side elevational view of another exemplary device being shown fitted with four clamping systems of FIG. 1.
Figure 19:
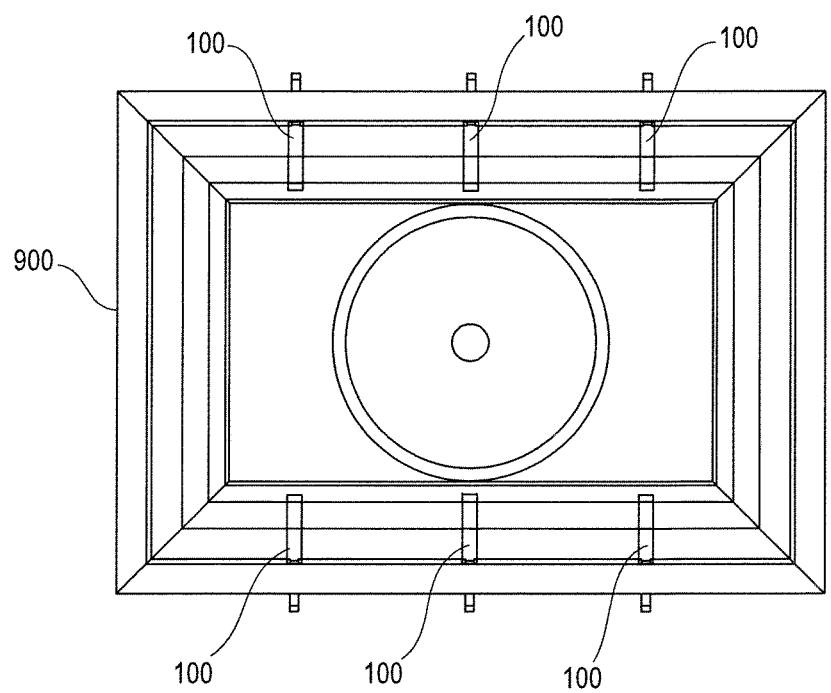
FIG. 19 depicts a side elevational view of another exemplary device being shown fitted with six clamping systems of FIG. 1.

FIGS. 17-19 show examples of the use of the modular clamping system 100 with progressively larger and/or heavier rectangular loudspeakers 700, 800, and 900, respectively. It is to be appreciated that the loudspeakers 700, 800, and 900 can be representative of any rectangular electronic or non-electronic device. FIGS. 17 and 18 show four clamping systems 100 fitted into the speakers 700 and 800, while FIG. 19 shows a considerably larger and/or heavier speaker 900 which can be mounted on a substrate using six clamping systems 100.

Referring next to FIGS. 20-25, perspective and sectional views of the modular clamping system 100 in a second embodiment of the present invention is shown, with the system 100 shown in various modes of deployment.

Figure 20:
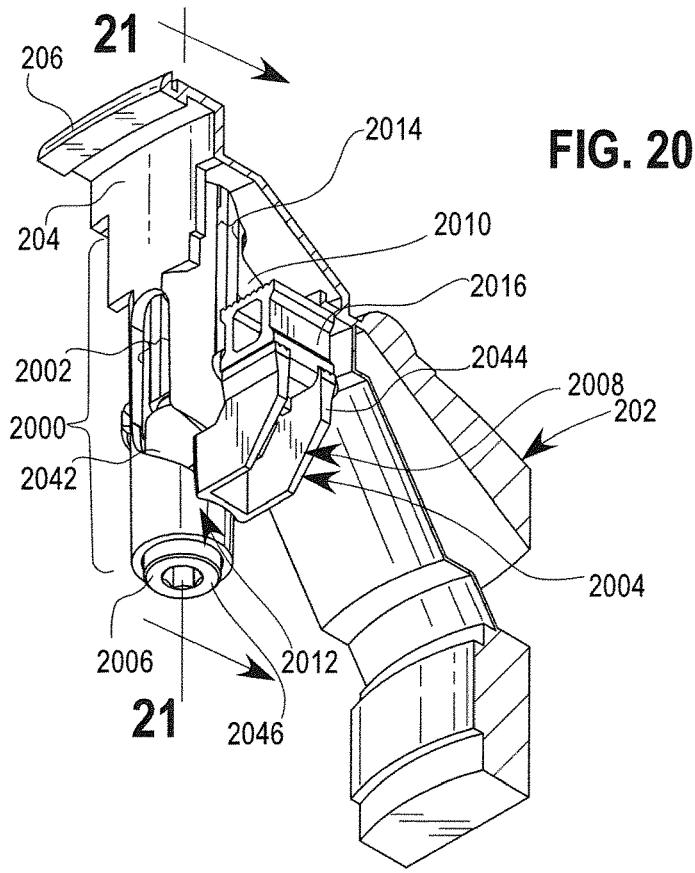
FIG. 20 depicts a perspective view of a clamping system according to one embodiment of the present invention shown fully open.
Figure 21:
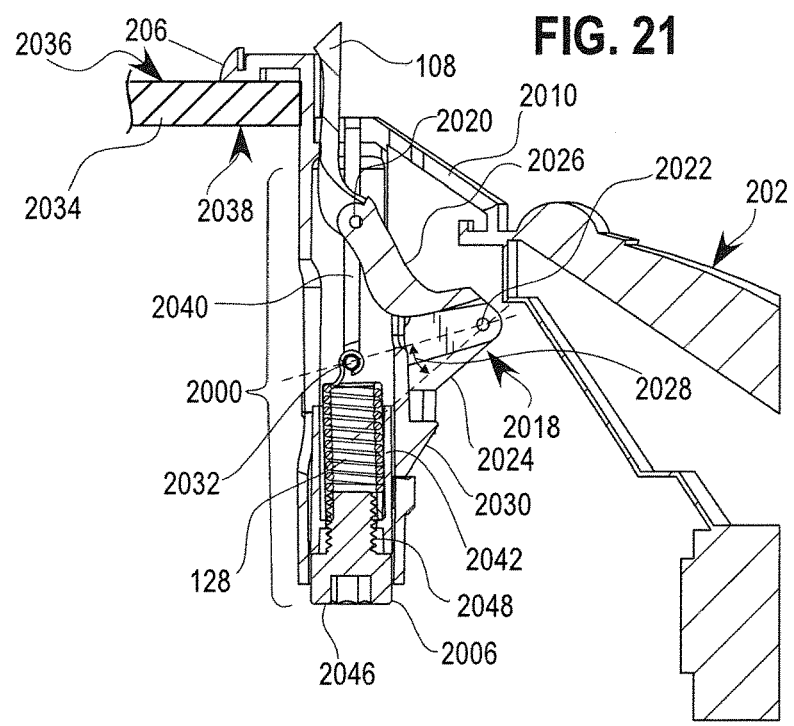
FIG. 21 depicts a sectional side elevational view of the clamping system taken along lines A-A of FIG. 20.

As shown in perspective view FIG. 20 and sectional view FIG. 21, the clamping system 100 is shown in the open or unlocked position. Shown in FIGS. 20 and 21 are the clamping system 100, the speaker body portion 202, the side wall 204, the flange 206, the tower housing 2000, a helical track 2002, a clamping arm assembly 2004, a screw 2006, a dog ear clamping arm 2008, a lever slot 2010, and a dog ear cylindrical support 2042. Also shown in FIG. 20 are a tower right face 2012, a right cross pin slot 2014, an extender 2016, a dog ear 2044, and a screw head 2046. Also shown in FIG. 21 are the expandable link 128, a link assembly 2018, the clamping lever 108, pivot joints 2020 and 2022, a left first link 2024, a second link 2026, an angle 2028, a left link attachment point 2030, a cross pin 2032, a substrate 2034, a substrate exterior surface 2036, a substrate interior surface 2038, a left cross pin slot 2040, and a screw shaft 2048.

In the embodiment shown, the clamping system 100 is shown integrated into the body portion 202 of the structure to be mounted (in this example, the speaker 200 as previously shown in FIGS. 6, 7, 15-19) although in other embodiments the clamping system 100 may be separate from the speaker 200, as described in the embodiment shown in FIGS. 1-19, and then mounted to the structure. It will be appreciated that while the clamping system 100 is shown integrated into the body portion 202 of the speaker 200, the clamping system 100 may be modified to clamp onto other structures and/or substrates, as previously noted.

As previously shown in FIGS. 6 and 7, the speaker 200 can have a body portion 202 including the side wall 204 that includes a projecting flange 206 which can be substantially perpendicular to the side wall 204. The speaker 200 can be mounted on the substrate 2034 (e.g., the wall 300 as shown in FIG. 7) by placing the speaker 200 in a hole in the wall 300 and securing the speaker 200 to the wall 300 as previously disclosed in FIG. 7.

The hollow, cylindrically-shaped tower housing 2000 can extend vertically downward from the body portion 202, with a front side of the tower housing 2000 approximately aligning with the side wall 204. The tower housing 2000 is described further below in FIG. 26. An upper end of the tower housing 2000, i.e. the end proximate to the flange 206, meshes with a hole in the body portion 202 proximate to the flange 206, the hole generally aligning with a cavity of the tower housing 2000. The opposite end, i.e. a lower end, of the tower housing 2000 can be open.

The tower housing 2000 can also include the helical track 2002 as shown in FIG. 20. The helical track 2002 comprises a continuous opening in a perimeter of the tower housing 2000. An upper end of the helical track 2002 is located proximate to the flange 206 and is substantially located on the front face of the tower housing 2000. The helical track 2002 continues downwards away from the flange 206 and then diagonally towards the right face 2012, terminating substantially at the right face 2012 of the tower housing 2000 proximate to the lower end of the tower housing 2000. Ends of the helical track 2002 may be rounded.

The tower housing 2000 can also include the right cross pin slot 2014 and the left cross pin slot 2040 (not shown). The cross pin slots 2014, 2040 are vertical slots located on the left and right faces 2012 of the tower housing 2000. The width of the cross pin slots 2014, 2040 are configured to allow the cross pin 2032 to slide within the cross pin slots 2014, 2040, as described further below. The cross pin slots 2014, 2040 begin at the upper end of the tower housing 2000 (proximate to the flange 206) and extend downward to approximately a midpoint of the tower housing 2000.

The tower housing 2000 can also include the left link attachment point 2030, as shown in FIG. 21, and a corresponding right link attachment point 2204 (not shown). The link attachments 2030, 2204 are configured to provide a pivot attachment point on a right side and a left side of the tower housing 2000, proximate to the lower end of the tower housing 2000. The link attachment points 2030, 2204 are described further below in FIG. 26.

Referring back to FIG. 20, in one embodiment the clamping arm assembly 2004 can comprise the dog ear clamping arm 2008, the screw 2006, the expandable link 128, and the cross pin 2032. The dog ear clamping arm 2008 can further comprise dog ear 2044, the cylindrical support 2042, and the extender 2016, shown fully below in FIG. 26. The hollow cylindrical support 2042 is encased within the tower housing 2000 and configured to slidably move within the tower housing 2000. The dog ear 2044 is coupled to a perimeter of the cylindrical support 2042 so that the dog ear 2044 extends through the helical track 2002 and may slide along the track. The dog ear 2044 can extend outward from the tower housing 2000 and then upwards towards the flange 206 in a general L-shape. It will be appreciated that the dog ear 2044 shape may vary, as long as the upwards-pointing portion is located such that the dog ear 2044 both clears the substrate 2034 hole when the clamping system 100 is in the open position and contacts the substrate 2034 when the clamping system 100 is in the closed position. In some embodiments the extender 2016 may be removably coupled to a free end of the dog ear 2044, i.e. the end of the dog ear 2044 not coupled to hollow cylindrical support 2042, to accommodate different thicknesses of substrate 2034. In some embodiments, multiple extenders 2016 with varying heights may be provided in order to accommodate a greater range of substrate 2034 thicknesses. The dog ear 2044 and/or extender 2016 may include teeth, corrugation, roughening or other texture on a face of the dog ear 2044 or extender 2016 contacting the substrate 2034. In one embodiment, the extender 2016 is removably coupled to the dog ear 2044 by sliding the extender 2016 in a dog ear track, with an extender 2016 snap tab engaging a dog ear 2044 slot. In one embodiment the shape of the dog ear 2044 is configured to be able to be manufactured by single injection molding, although it will be appreciated that other methods of forming and shapes may also be used, such as compound molding or metal cast, optionally with multiple parts The threaded screw shaft 2048 can be coupled to the expandable link 128, with an end of the expandable link 128 proximate to the screw 2006 coupled to an end of the screw shaft 2048 such that the expandable link 128 may rotate in relation to the screw 2006 while still remaining coupled to the screw 2006. The screw 2006 is located proximate to the lower portion of the tower housing 2000, with the shaft 2048 extending upwards. In the present embodiment, the screw head 2046 is a hex-head type head, but it will be appreciated that other types of fastener heads may be used, e.g. a cap screw, pan head screw, hex bolt, button head screw or a custom screw. In some embodiments the screw may be comprised of steel, stainless steel, brass or nylon. The link assembly 2018 is configured to fit within the cylindrical support 2042 and be coupled to the link assembly 2018 so that the clamping arm assembly 2004 can move with the screw 2006 and expandable link 128 along a longitudinal axis of the tower housing 2000, and the cylindrical support 2042 is free to rotate within the tower housing 2000 as allowed by the helical track 2002. In the embodiment shown, the expandable link 128 can comprise a coiled spring where a portion of spring loops at the end of the spring encircle the end of the threaded screw shaft 2048, permitting the spring loops to rotate relative to the screw 2006 while the spring remains coupled to the screw 2006 during axial translation. In some embodiments the spring may be comprised of steel, music wire, stainless steel or titanium. While in the present embodiment a threaded screw is used to couple to the dog ear clamping arm 2008 to the expandable link 128, those skilled in the art will note that other configurations are possible, e.g. configuring the dog ear clamping arm 2008 to couple directly to the expandable link 128, or by other methods such as rivets, tethers, or spring steel. An upper end of the expandable link 128 distal to the screw 2006 is coupled to the cross pin 2032, where each end of the cross pin 2032 is located within the respective cross pin slot 2014, 2040 so that the cross pin 2032 may slide along the longitudinal axis of the tower housing 2000.

Referring again to FIG. 21, in the present embodiment, the cross pin 2032 extends past the tower housing 2000 perimeter, at which location each cross pin 2032 end is pivotally coupled to an end of the second link 2026. In one embodiment, the cross pin 2032 can include flared ends. In another embodiment, the cross pin 2032 can comprise a threaded bolt and nut. Each lower side of the second link 2026 is pivotally coupled to the right first link 2200 (not shown) or the left first link 2024. The left first link 2024 is pivotally coupled to the left link attachment point 2030 and the right first link 2200 is pivotally coupled to the right link attachment point 2204 (not shown), thereby coupling the link assembly 2018 to the tower housing 2000. The second link 2026 is also pivotally coupled to the lever 108, the attachment of which is described further below in FIG. 23. As shown in FIG. 21, the clamping lever 108 extends through the lever slot 2010. The operation and geometry of the second link 2026 is described further below in FIG. 26.

The clamping lever 108 is pivotally connected to the second link 2026 by the pivot joint 2020, and extends upward through the lever slot 2010 in the body portion 202. The lever slot 2010 is configured to extend inwards away from the flange 206 in a generally perpendicular direction. The length and width of the lever slot 2010 are configured to permit the required movement of the second link 2026 and clamping lever 108 as the clamping system 100 is moved between the open, closed, and stored positions. The clamping lever 108 is further described below in FIG. 26. In one embodiment, pivot joints may comprise rotatable rivet connections, although it will be appreciated that other pivot connections, such as those previously described, may be used.

Figure 22:
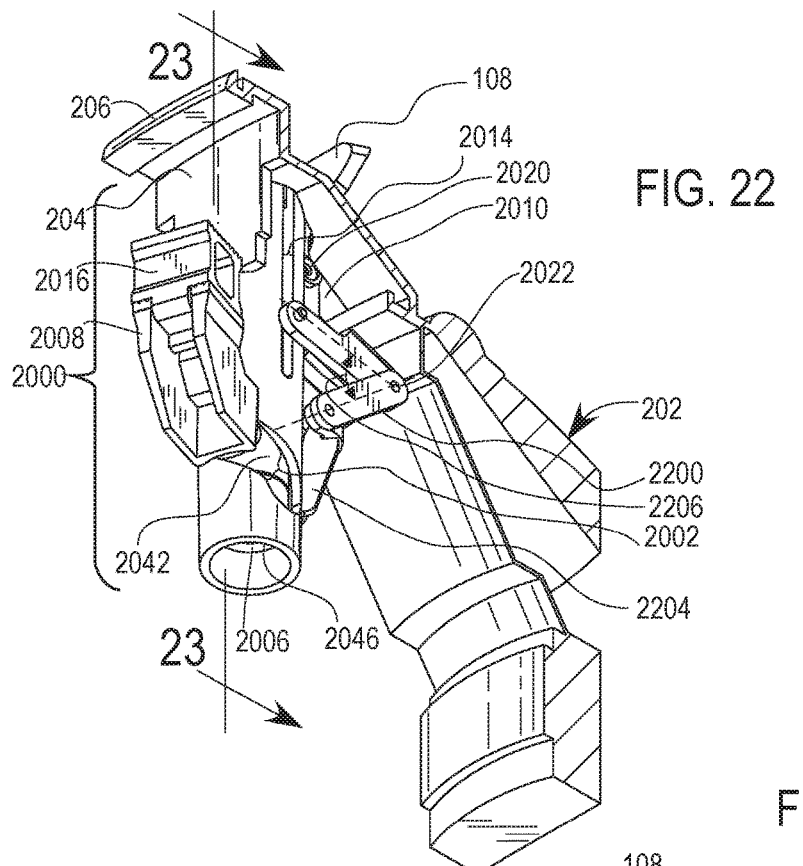
FIG. 22 depicts a perspective view of the clamping system shown with the clamping lever and the clamping arm being partially moved toward the closed position.
Figure 23:
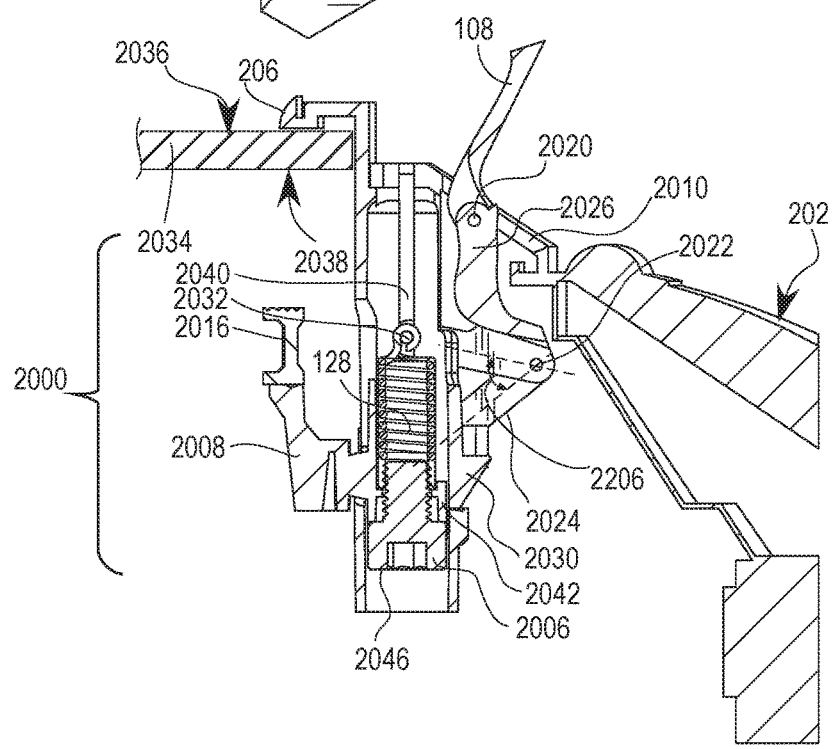
FIG. 23 depicts a sectional side elevational view of the clamping system taken along lines A-A of FIG. 22.

Referring again to FIGS. 20-25, the clamping system 100 is shown in operation from the open (FIGS. 20, 21) to the closed (FIGS. 24, 25) position. An intermediate position of the clamping system 100 is shown in FIGS. 22 and 23. Not shown is a lever stored position 2702 (shown below in FIG. 27).

As shown in FIGS. 20 and 21, the clamping system 100 is in the open position. The dog ear clamping arm 2008 in an open arm position is in the lower-most position permitted by the helical track 2002 and is substantially located on the tower right face 2012. It should be noted that the dog ear clamping arm 2008 in the open arm position may also be located on a left face side of the tower housing 2000, with the corresponding revisement of the helical track 2002 location. The shape of the dog ear clamping arm 2008, and the location of the dog ear clamping arm 2008 in the open arm position, are configured such that when the clamping system 100 is in the open position, the dog ear clamping arm 2008 (and extender 2016 if used) in the open arm position does not extend past an interior lip of the flange 206. This allows the speaker 200 with the clamping system 100 to be properly inserted into the mounting hole in the substrate 2034 so that the flange 206 comes into contact with the substrate 2034 while the dog ear clamping arm 2008 (and extender 2016 as applicable) does not contact the substrate 2034.

The screw 2006 and expandable link 128, being coupled to the dog ear clamping arm 2008, are also located in their most downward position in the open position.

In the present embodiment, an open lever position of the clamping lever 108 in is in a substantially vertical position, but it should be noted that other positions are allowable, as long as the open lever position permits enough movement of the clamping lever 108 to result in the dog ear clamping arm 2008 being moved to a closed arm position and the open lever position of the clamping lever 108 still permits the speaker 200 with the clamping system 100 to be fully inserted in the substrate 2034 hole.

In the open position, the angle 2028 between the right or left first link 2024, 2200 and the portion of the second link 2026 coupling the right or left first link 2024, 2200 to the cross pin 2032 is an acute angle 2028 as shown in FIG. 21.

Referring next to FIGS. 22 and 23, as the user moves the clamping lever 108 inwards, i.e. away from the flange 206, the link assembly 2018 moves the cross pin 2032 upwards in the cross pin slots 2014, 2040. As the cross pin 2032 moves upwards, it pulls the clamping arm assembly 2004 upwards. The helical track 2002 directs the movement of the dog ear clamping arm 2008 and causes the dog ear clamping arm 2008 to rotate towards the flange 206 and move upwards, as the cross pin 2032 moves upwards. As the coupling of the dog ear clamping arm 2008 to the expandable link 128 is free with respect to rotation in the present embodiment, the dog ear clamping arm 2008 may rotate with respect to the tower housing 2000 longitudinal axis while the expandable link 128 does not. As shown in FIGS. 22 and 23, in the intermediate position the dog ear 2044 has been rotated approximately 90 degrees from position shown in FIGS. 20 and 21, and has been moved upwards towards the flange 206. During operation, the screw 2006 may rotate with respect to the expandable link 128 or may be rotationally fixed with respect to the expandable link 128.

As the user continues to move the clamping lever 108 inwards, it travels through the lever slot 2010 in the body portion 202, and can also rotate towards a center of the body portion 202. The angle 2206 between the right or left first link 2024, 2200 and the portion of the second link 2026 coupling the right or left first link 2024, 2200 to the cross pin 2032 has widened from the open position angle 2028 shown in FIG. 21 but remains acute, as illustrated in FIG. 23.

Figure 24:
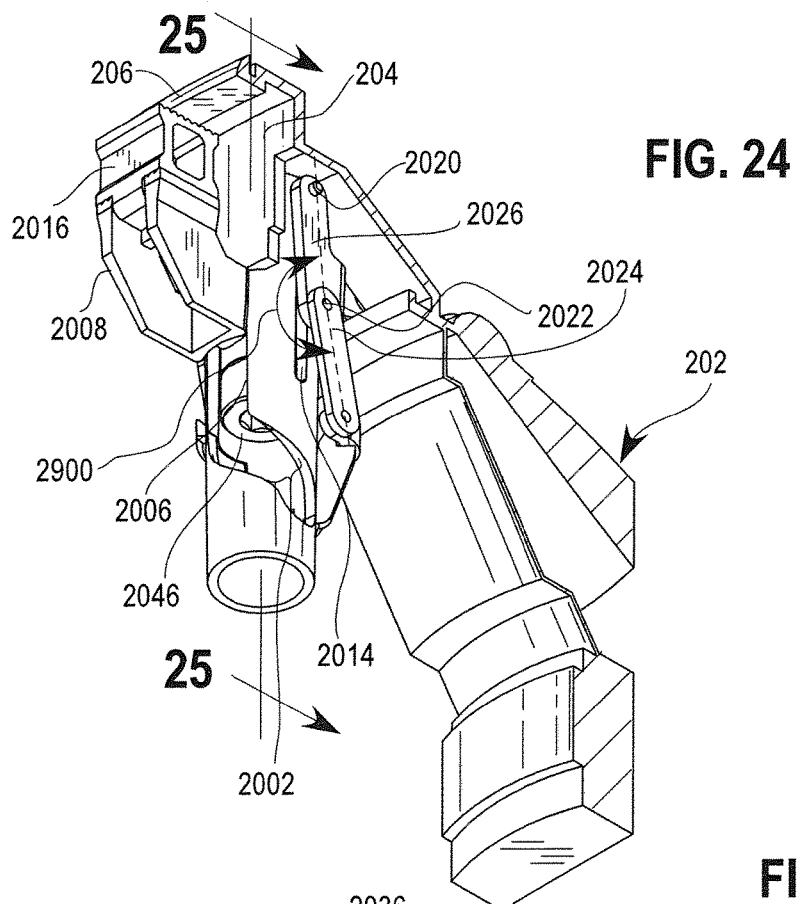
FIG. 24 depicts a perspective view of the clamping system shown with the clamping system in the closed position.
Figure 25:
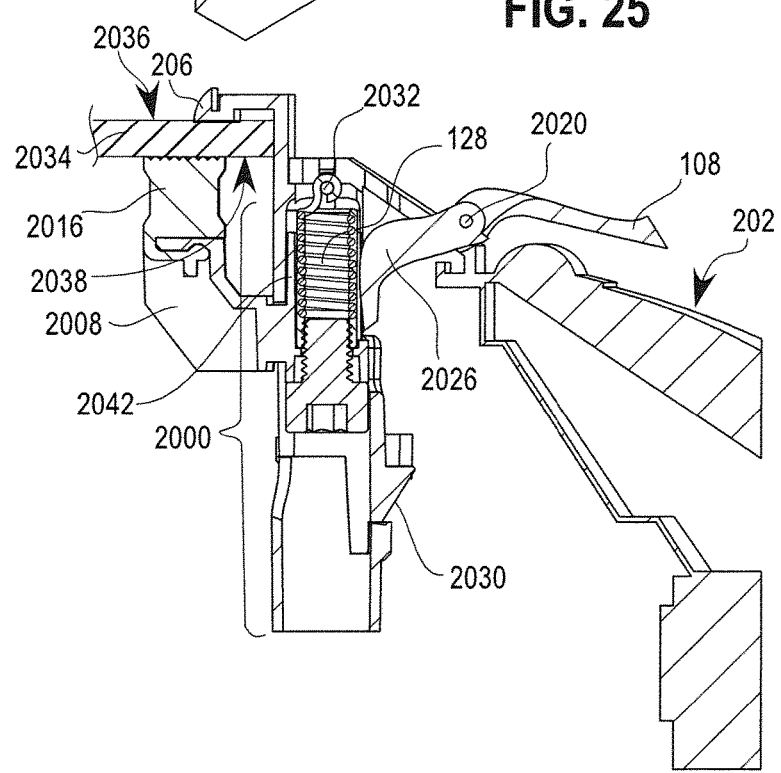
FIG. 25 depicts a sectional side elevational view of the clamping system taken along lines A-A of FIG. 24.

Referring next to FIGS. 24 and 25, the clamping system 100 is shown with the clamping lever 108 moved from an intermediate lever position to the closed lever position. In the closed lever position, the clamping lever 108 has moved so that the clamping lever 108 is further inward of the flange 206, and in an approximately horizontal position. In some embodiments an end of the lever slot 2010 may serve as a stop to the movement of the clamping lever 108.

The lever movement has resulted in cross pin 2032 being pulled upwards in the cross pin slots 2014, 2040, causing the dog ear clamping arm 2008 to continue to move within the helical track 2002, coming into contact with the substrate interior surface 2038. In the embodiment shown, the helical track 2002 is configured such that the dog ear clamping arm 2008 has already fully rotated towards the flange 206 before contacting the substrate 2034.

In one embodiment, a spring constant of the expandable link 128 is chosen such that when the dog ear clamping arm 2008 contacts the substrate 2034, the continued movement of the clamping lever 108 extends the expandable link 128, thus exerting pressure on the substrate 2034 and forcibly clamping the substrate 2034 between the dog ear clamping arm 2008 and the flange 206, without causing damage to the clamping system 100 or substrate 2034. The spring constant may also be chosen to limit the magnitude of the force required by the user to move the clamping lever 108 from the open lever position to the closed lever position, so that the user may overcome the maximum spring force exerted while closing the clamping system, in order for the user to be able to move the clamping lever 108 to the closed lever position.

The free end of the clamping arm assembly 2004 contacts the interior surface 2038 of the substrate 2034 while the clamping lever 108 is still being moved. The movement of the clamping lever 108 after the clamping arm assembly 2004 contacts the substrate 2034 extends the expandable link 128, resulting in a spring force clamping the substrate 2034 between the dog ear clamping arm 2008 and the flange 206, as previously described.

As the clamping lever 108 continues to move the cross pin 2032 upwards towards the closed position, the angle between the second link 2026 and the first links 2024, 2200 continues to widen to an 180 degree angle, and then "snap" past the 180 degree angle to an angle greater than 180 degrees, as shown by a resulting angle 2400. As previously described, the snapping past the center 180 degree position results in an over-toggle position that locks the clamping system 100 in place relative to the clamping lever 108. As previously mentioned, the spring constant of the expandable link 128 is chosen to provide sufficient clamping force to the substrate 2034 when the lever clamping system 100 is in the over-toggle position.

Figure 26:
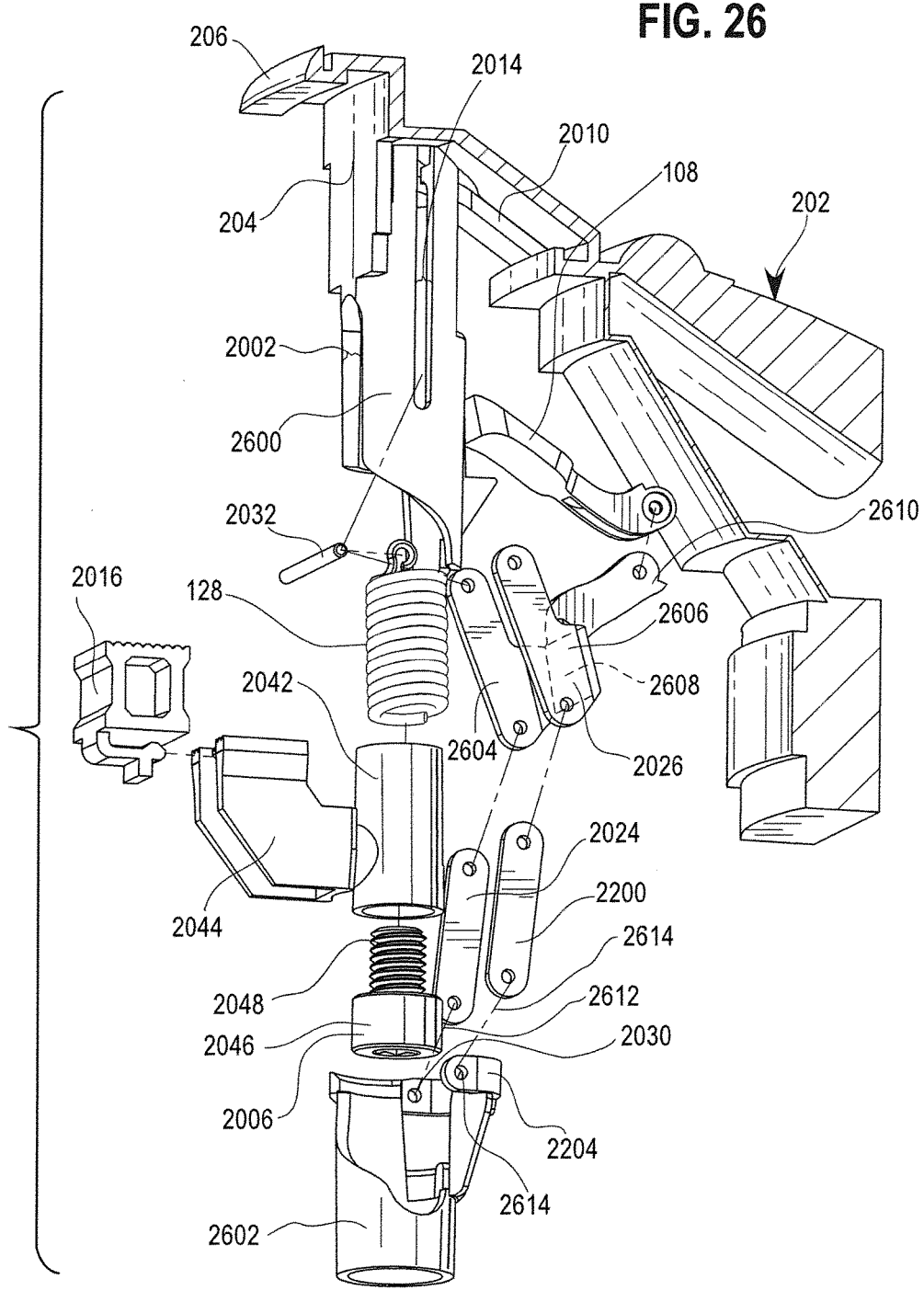
FIG. 26 depicts a perspective exploded view of the clamping system.

Referring next to FIG. 26, an exploded view of the clamping system 100 further illustrates the geometry and connectivity of the apparatus. It should be noted that the geometric relationships between elements as shown in FIG. 26 have been chosen to best display the elements and are not intended to correspond to a working relationship. Shown are the clamping lever 108, the expandable link 128, the speaker body portion 202, the side wall 204, the flange 206, the helical track 2002, the screw 2006, the dog ear 2044, the lever slot 2010, the right cross pin slot 2014, the extender 2016, the left first link 2024, the second link 2026, the left link attachment point 2030, the cross pin 2032, the cylindrical support 2042, the screw head 2046, the screw shaft 2048, the right first link 2200, the right link attachment point 2204, an upper tower portion 2600, a lower tower portion 2602, a left second link 2604, a right second link 2606, a second link connector 2608, a second link lever connector 2610, a pivot joint 2612, and a pivot joint 2614.

As previously described, the clamping system 100 can be divided into three main elements: The link assembly 2018, the tower housing 2000, and the clamping arm assembly 2004. In the embodiment shown, the tower housing 2000 is comprised of two portions, the upper tower portion 2600 which may be integral with the body portion 202, and the lower tower portion 2602 which in the present embodiment is coupled to the upper tower portion 2600. In one embodiment the upper tower portion 2600 and the lower tower portion 2602 may be configured to snap together. An adhesive may be used to couple the tower portions 2600, 2602, either alone or in conjunction with mechanical coupling such as a screw or snap connection. In other embodiments the tower housing 2000 may be one piece coupled to the body portion 202, or may be comprised of three or more pieces. In another embodiment, the entire tower housing 2000 may be formed integrally with the body portion 202.

The screw 2006, the dog ear clamping arm 2008 and the expandable link 128 form the clamping arm assembly 2004, where as noted previously the screw 2006 and expandable link 128 are coupled together and fit within the cylindrical support 2042 of the dog ear clamping arm 2008. The dog ear clamping arm 2008 portion of the clamping arm assembly 2004 protrudes through the helical track 2002. The expandable link 128, screw 2006 and the cylindrical support 2042 are encased by the tower housing 2000.

As previously described, the upper end of the expandable link 128 is coupled to the cross pin 2032.

The second link 2026 is comprised of the left second link 2604, the right second link 2606, the second link connector 2608 and the second link lever connector 2610. In one embodiment, the second link 2026 is integrally formed from molded plastic. In other embodiments the second link 2026 may be made from molded plastic, formed using a CNC machine, or may be cast metal. The left second link 2604 and the right second link 2606 together with the second link connector 2608 form a U-shape, with the second link lever connector 2610 extending outwards from the base of the U-shape to further form a Y-shape. A free end of the right second link 2606 is pivotally coupled to the right cross pin 2032 end and a free end of the left second link 2604 is pivotally coupled to the left cross pin 2032 end. The right second link 2606 is pivotally connected to the right first link 2200 proximate to the base of the U-shape, forming a pivot joint 2202. The left second link 2604 is pivotally connected to the left first link 2024 proximate to the base of the U-shape, forming the pivot joint 2022. A free end of the second link lever connector 2610 is pivotally coupled to the clamping lever 108, forming the pivot joint 2020. The right first link 2200 is pivotally coupled to the right link attachment point 2204 of the tower housing 2000 forming the pivot joint 2614, and the left first link 2024 is pivotally coupled to the left link attachment point 2030 of the tower housing 2000, forming the pivot joint 2612. In the embodiment shown, the attachment points 2030 2204 are shown extending from a wing on each side of the tower housing 2000, but it will be appreciated that alternate forms of attachment locations and configurations may be used, for example pins that extend outward from the tower housing 2000 perimeter.

The body portion 202 includes the lever slot 2010 and the flange 206, as previously described.

Referring again to FIG. 26, the tower housing 2000 extends downward from the body portion 202 of the speaker 200 and is used as a housing for the clamping arm assembly 2004, a guide for the dog ear clamping arm 2008 and the cross pin 2032, and a support point for the link assembly 2018.

The second link 2026 couples together the link assembly 2018 and the clamping arm assembly 2004, and also includes an attachment point for the clamping lever 108. As the first link 2200, 2024 and cross pin 2032 attachment points are located on each side of the tower housing 2000, the second link 2026 comprises the left second link 2604 and the right second link 2606 in order to linearly couple the cross pin 2032 ends to the first link 2200, 2024 ends. However, in order to also connect to the single clamping lever 108 which is aligned with the longitudinal axis of the tower housing 2000, the second link 2026 is formed in a Y-shape with the upper portion of the Y comprising the left and right second links 2604 2606 and the second link connector 2608 plus the lever connector 2610 forming the bottom portion of the Y and connecting to the clamping lever 108.

In some embodiments the clamping lever 108 can be shaped to fit within the tower housing 2000 when the clamping system 100 is in the open position, or to lay mostly flat against the body portion 202 when the clamping system 100 is in the closed or stored position, although it will be appreciated that other clamping lever 108 configurations are also possible.

Figure 27:
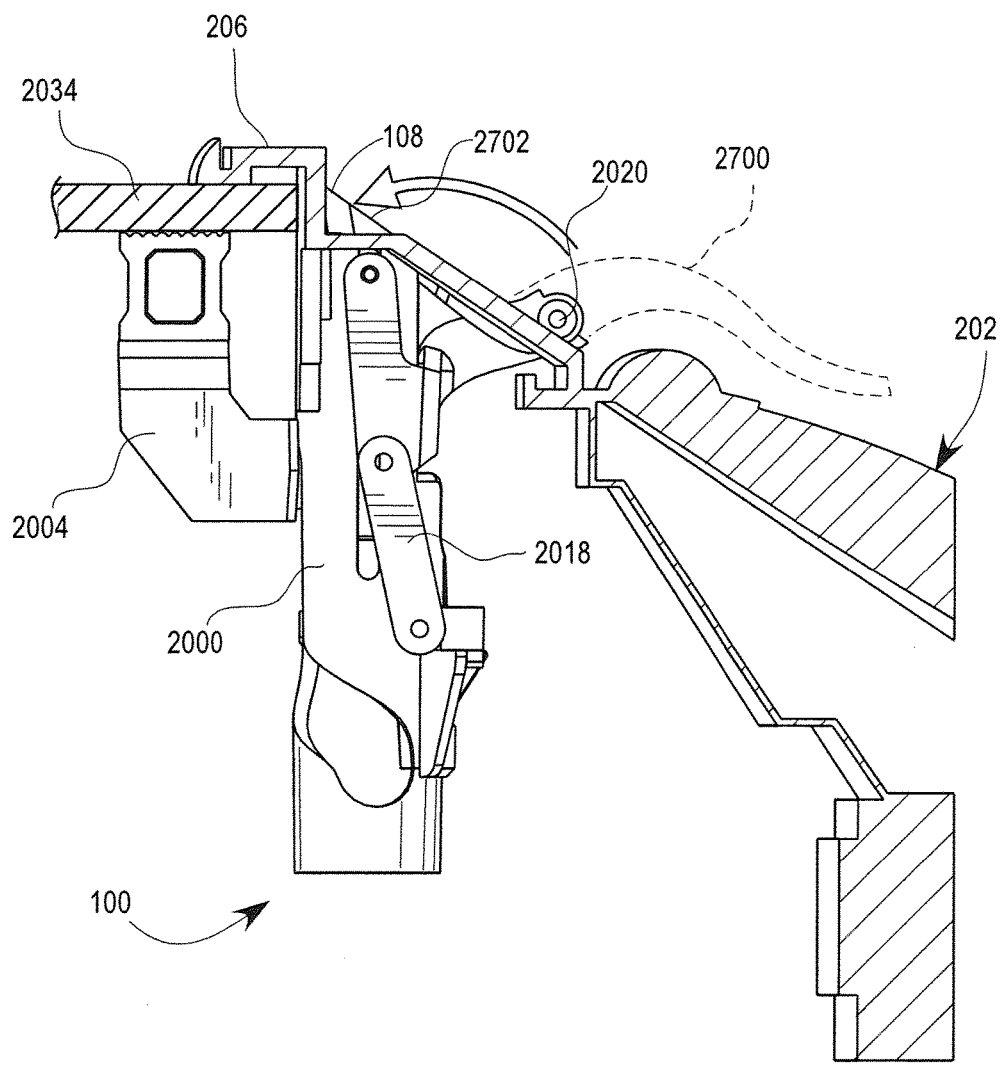
FIG. 27 depicts a side elevational view of the clamping system shown in the locked position

Referring next to FIG. 27, the clamping system 100 is shown in the closed and stored position. Shown are the clamping lever 108, the body portion 202, the flange 206, the tower housing 2000, the clamping arm assembly 2004, the link assembly 2018, the pivot joint 2020, the substrate 2034, and the clamping lever stored position 2702. A dashed line 2700 indicates the clamping lever 108 in the closed, but not stored, position.

When the clamping system 100 is in the closed position as indicated by the dashed line 2700, the over-toggle mechanism of the link assembly 2018 locks the link assembly 2018 in the closed position and permits the clamping lever 108 to be pivoted about the pivot joint 2020, to the second link 2026, while the rest of the clamping arm assembly 2004 remains in the closed position. The clamping lever 108 is rotated towards the flange 206 and in the embodiment shown approximately fits within the lever slot 2010, partially conforming to the profile of the body portion 202, as shown by the clamping lever stored position 2702.

Referring next to FIGS. 28 and 29, the unlocking of the clamping system 100 is shown. Shown are the clamping lever 108, the body portion 202, the tower housing 2000, the helical track 2002, the clamping arm assembly 2004, the link assembly 2018, the pivot joint 2020, the substrate 2034, and a clamping arm upward direction 2800.

The clamping system 100 also permits unclamping of the clamping system 100 after the system 100 is in the closed and/or stored position. The clamping system 100 is shown in the closed and stored position in FIG. 28. To release the clamping arm assembly 2004 from the substrate 2034, the pivot joint 2020 between the second link 2026 and the clamping lever 108 is pushed away from the speaker 200 in the generally upward direction 2800. This movement causes the link assembly 2018 to snap back through the over-toggle position, releasing the mechanism and returning it to the intermediate position, e.g. the position similar to that shown in FIGS. 22 and 23, releasing the substrate 2034 from the clamping system 100 as shown in FIG. 29. The clamping lever 108 may then returned to the open lever position (as previously shown in FIGS. 20 and 21), causing the dog ear clamping arm 2008 to move further downward on the helical track 2002 such that the dog ear clamping arm 2008 is in the original open arm position and the speaker 200 can be removed from the substrate 2034 without being blocked by the dog ear clamping arm 2008.

The foregoing exemplary embodiments describe a modular clamping system that can be interchangeably used with a large variety devices and fixtures to mount the devices and fixtures onto underlying substrates such as walls, ceilings, doors, or the like. The clamping system described above provides a cost-effective and time saving alternative to the devices presently used to secure various devices and fixtures onto underlying substrates.

It is understood that the above-described arrangements are only illustrative of the application of the basic principles of the present invention. Numerous modifications and alternative arrangements may be devised by those skilled in the art without departing from the spirit and scope of the present invention. For example, the clamping system 100 may vary in shape and/or size depending on the shape, size, and weight of the device to be mounted to the structure. Although the clamping system 100 has been illustrated in use with electronic devices such as speakers, the clamping system 100 can easily be adapted to any type of device or structure which requires a tool-free connection to a substrate.

What is claimed is:

1. A clamping system for clamping a structure to a substrate having a hole comprising:
   a housing;
   a clamping assembly, wherein a portion of the clamping assembly is encased within the housing and configured to slidably move within the housing, the clamping assembly further comprising a clamping arm coupled to an expandable link, wherein the expandable link is a spring biased to pull the clamping arm toward the closed arm position when the clamping lever is in the closed lever position;
   a clamping lever pivotally coupled to the housing, wherein the clamping arm is in an open arm position when the clamping lever is in an open lever position, the open arm position including the clamping arm located entirely within a perimeter of the hole when the structure is inserted in the hole and the clamping arm not in contact with the substrate, and whereby moving the clamping lever to a closed lever position moves the clamping arm to a closed arm position such that the clamping arm is located at least partially outside the hole perimeter and contacting the substrate.

2. The clamping system of claim 1, wherein the housing includes a track configured for guiding movement of the clamping arm from the open arm position to the closed arm position.

3. The clamping system of claim 2, wherein the track is configured such that the movement of the clamping arm from the open arm position to the closed arm position includes rotational and translational movement of the clamping arm.

4. The clamping system of claim 1, wherein the clamping arm is a dog-ear shape.

5. The clamping system of claim 1, further comprising an extender coupled to an end of the clamping arm not coupled to the housing.

6. The clamping system of claim 5, wherein a surface of the extender opposite to a side of the extender coupled to the clamping arm includes a textured surface.

7. The clamping system of claim 1, wherein an end of the clamping arm not coupled to the housing includes a textured surface.

8. The clamping system of claim 1, wherein a threaded screw couples the clamping arm to the expandable link.

9. The clamping system of claim 1, the structure including a flange, wherein the substrate is clamped between the flange and the clamping arm when the clamping arm is in the closed arm position.

10. The clamping system of claim 1, wherein the link assembly is configured such that moving the clamping lever from the open lever position to the closed lever position moves the clamping assembly to an over-toggle position, the over-toggle position configured to prevent the clamping lever from rotating toward the open lever position, when the clamping lever is in the closed lever position.

11. The clamping system of claim 10, wherein the over-toggle position prevents the clamping arm from moving when the clamping lever is rotated from the closed lever position to a stored position.

* * * * *